US008553051B2

(12) United States Patent
Chen et al.

(10) Patent No.: US 8,553,051 B2
(45) Date of Patent: Oct. 8, 2013

(54) LIQUID CRYSTAL DISPLAY AND DRIVING METHOD THEREOF

(75) Inventors: Yu-Yeh Chen, Tainan (TW); Feng-Sheng Lin, Tainan (TW); Chin-Cheng Tsai, Tainan (TW); Fu-Chi Yang, Tainan (TW); Chia-Hang Lee, Tainan (TW); Ming-Chia Shih, Tainan (TW)

(73) Assignee: Chimei Innolux Corporation, Miao-Li County (TW)

( * ) Notice: Subject to any disclaimer, the term of this patent is extended or adjusted under 35 U.S.C. 154(b) by 485 days.

(21) Appl. No.: 12/406,235

(22) Filed: Mar. 18, 2009

(65) Prior Publication Data

US 2009/0244109 A1 Oct. 1, 2009

(30) Foreign Application Priority Data

Mar. 18, 2008 (TW) .............................. 97109553 A

(51) Int. Cl.

*G09G 5/10* (2006.01)
*G09G 3/36* (2006.01)
*G06K 9/40* (2006.01)

(52) U.S. Cl.

USPC ................. 345/690; 345/88; 345/89; 345/94; 345/98; 382/254

(58) Field of Classification Search

USPC ............ 349/37, 39, 143–144; 345/81, 87–90, 345/94, 100, 205, 211, 690, 178, 213, 601, 345/96, 103, 92, 84, 698, 204, 98; 1/1; 358/1.9, 3.01, 3.22; 382/254; 600/410; 348/674

See application file for complete search history.

(56) References Cited

U.S. PATENT DOCUMENTS

| | | | | |
|---|---|---|---|---|
| 5,117,298 | A * | 5/1992 | Hirai | 345/96 |
| 6,040,814 | A * | 3/2000 | Murakami et al. | 345/94 |
| 2002/0033789 | A1* | 3/2002 | Miyata et al. | 345/89 |
| 2003/0128299 | A1* | 7/2003 | Coleman et al. | 348/674 |
| 2003/0146893 | A1* | 8/2003 | Sawabe | 345/89 |
| 2006/0103615 | A1* | 5/2006 | Shih et al. | 345/88 |
| 2007/0092154 | A1* | 4/2007 | Kato et al. | 382/254 |
| 2008/0191989 | A1* | 8/2008 | Lee et al. | 345/98 |

(Continued)

FOREIGN PATENT DOCUMENTS

| | | |
|---|---|---|
| JP | 63-273838 | 11/1988 |
| JP | 04-4118625 | 4/1992 |

(Continued)

*Primary Examiner* — Quan-Zhen Wang
*Assistant Examiner* — Lin Li
(74) *Attorney, Agent, or Firm* — Trop Pruner & Hu, P.C.

(57) ABSTRACT

A liquid crystal display (LCD) includes an LCD panel, a scan driver, a timing controller and a data driver. The LCD panel includes first and second pixel rows. The timing controller determines a correction voltage index according to an absolute difference between an average of original pixel voltages corresponding to original pixel data of all pixels of the first pixel row, and an average of original pixel voltages corresponding to original pixel data of all pixels of the second pixel row, determines a correction voltage according to the correction voltage index, determines an adjusted pixel voltage in a target pixel according to an original pixel voltage of the target pixel in the second pixel row and the correction voltage, and outputs adjusted pixel data corresponding to the adjusted pixel voltage. The data driver outputs the adjusted pixel voltage to the target pixel according to the adjusted pixel data.

18 Claims, 14 Drawing Sheets

(56) References Cited

U.S. PATENT DOCUMENTS

| | | | | |
|---|---|---|---|---|
| 2008/0266232 | A1* | 10/2008 | Hsu | 345/96 |
| 2009/0040245 | A1* | 2/2009 | Hashimoto | 345/690 |
| 2009/0279007 | A1* | 11/2009 | Shih et al. | 349/37 |
| 2010/0053047 | A1* | 3/2010 | Chen et al. | 345/84 |
| 2010/0231617 | A1* | 9/2010 | Ueda et al. | 345/690 |

FOREIGN PATENT DOCUMENTS

| | | |
|---|---|---|
| JP | 07-318898 | 12/1995 |
| JP | 11-212520 | 8/1999 |
| JP | 2001255851 | 9/2001 |
| JP | 2005148386 | 6/2005 |

* cited by examiner

| | | | | | | | |
|---|---|---|---|---|---|---|---|
| 255<br>+ | 255<br>- | 255<br>+ | 0<br>- | 0<br>+ | 0<br>- | . . . | 0<br>- |
| 0<br>+ | 0<br>- | 0<br>+ | 255<br>- | 255<br>+ | 255<br>- | . . . | 0<br>- |
| ⋮ | ⋮ | ⋮ | ⋮ | ⋮ | ⋮ | ⋱ | ⋮ |
| 0<br>+ | 0<br>- | 0<br>+ | 255<br>- | 255<br>+ | 255<br>- | . . . | 0<br>- |

| | | | | | | | |
|---|---|---|---|---|---|---|---|
| 0<br>+ | 64<br>- | 0<br>+ | 0<br>- | 0<br>+ | 0<br>- | . . . | 0<br>- |
| 0<br>+ | 0<br>- | 0<br>+ | 0<br>- | 64<br>+ | 0<br>- | . . . | 0<br>- |
| ⋮ | ⋮ | ⋮ | ⋮ | ⋮ | ⋮ | ⋱ | ⋮ |
| 0<br>+ | 0<br>- | 0<br>+ | 0<br>- | 64<br>+ | 0<br>- | . . . | 0<br>- |

LIQUID CRYSTAL DISPLAY AND DRIVING METHOD THEREOF

CROSS-REFERENCE TO RELATED APPLICATION

This application claims the benefit of Taiwan application Serial No. 97109553, filed Mar. 18, 2008, the subject matter of which is incorporated herein by reference.

BACKGROUND

The invention relates in general to a liquid crystal display (LCD) and a driving method thereof, and more particularly to an LCD capable of suppressing cross talk, and a driving method thereof.

In the field of LCD technology, the quality of an image displayed on an LCD panel may be detrimentally affected by a cross-talk phenomenon that results from voltage offsets on the common electrode of a pixel. To illustrate the effects of the cross-talk phenomenon, consider FIG. 1A (Prior Art), which shows an example of an image to be displayed by a conventional LCD. FIGS. 1B and 1C (Prior Art) show the gray levels that should be displayed by the pixels in regions 10 and 20 of the image in FIG. 1A, respectively. FIG. 1D (Prior Art) shows an image that is actually displayed by the conventional LCD. As can be seen in FIG. 1D, the displayed gray levels in the regions 121 and 122 of the displayed image do not accurately correspond with the gray levels that should have been displayed. The poor quality of the displayed gray levels in FIG. 1D is due to the cross-talk phenomenon.

FIG. 2 (Prior Art) is a circuit diagram representing a pixel of an LCD. As shown in FIG. 2, the pixel includes a transistor 210, a storage capacitor Cst and a liquid crystal capacitor $C_{LC}$. The transistor 210 has a first terminal coupled to a data line 240, and a second terminal coupled to each of the first terminals of the storage capacitor Cst and the liquid crystal capacitor $C_{LC}$. Second terminals of the storage capacitor Cst and the liquid crystal capacitor $C_{LC}$ are respectively coupled to a common electrode 220 of a lower substrate and a common electrode 230 of an upper substrate (i.e., a transparent electrode (ITO)). A parasitic capacitor is formed between the data line and the common electrode, wherein a parasitic capacitor Cxd is formed between the data line 240 and the common electrode 220, while a parasitic capacitor Cxu is formed between a data line 250 and the common electrode 230. The formation of these parasitic capacitors contributes to the occurrence of the cross-talk phenomenon.

More specifically, when the data lines 240 and 250 experience voltage fluctuations, such as when the voltages at the first terminals of the parasitic capacitors Cxd and Cxu fluctuate, the levels of the voltages at the second terminals of the parasitic capacitors Cxd and Cxu (i.e., the levels of the common voltages at the common electrodes 220 and 210) fluctuate therewith. As a result, when the transistor 210 is turned on, the voltage stored on the storage capacitor Cst and the liquid crystal capacitor $C_{LC}$ is offset so that the gray level actually displayed by the pixel is different from the desired gray level. For instance, when the image of FIG. 1A is to be displayed, the LCD instead may produce the image of FIG. 1D. As shown in FIG. 1D, the regions 121 and 122 have different brightness levels and tones from those of the image in FIG. 1A so that the image quality is poor. This degradation in image quality is the result of the so-called cross-talk phenomenon.

BRIEF DESCRIPTION OF THE DRAWING

Some embodiments of the invention are described with respect to the following figures.

DETAILED DESCRIPTION OF THE INVENTION

In embodiments of the invention, an LCD system addresses the cross-talk phenomenon by adjusting the voltage applied to a pixel in a manner that compensates for any offset of the voltage on the common electrode. In accordance with this compensation scheme, the voltage seen by the liquid crystal molecules more closely corresponds to the voltage that represents the desired gray level for the pixel. In general, in accordance with embodiments of the invention, when the averages of original pixel voltages corresponding to original pixel data of pixels in adjacent pixel rows (i.e., the target gray levels to be displayed by the pixels) are different from each other, the LCD system adjusts the pixel voltages of each of the pixels in the pixel rows to compensate for the offset of the voltage on the common electrode caused by the cross talk phenomenon.

Figure 3:
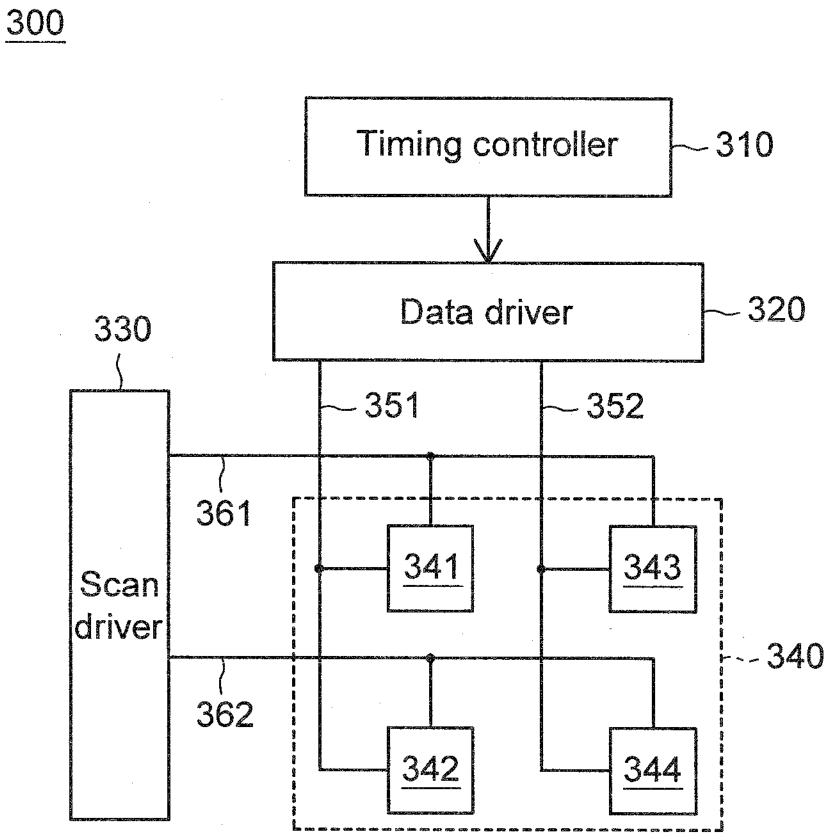
FIG. 3 is a block diagram showing an exemplary LCD system, according to an embodiment of the invention.

FIG. 3 is a block diagram showing an LCD system 300 according to an embodiment of the invention. The LCD system 300 includes a timing controller 310, a data driver 320, a scan driver 330, an LCD panel 340, data lines 351 and 352, and scan lines 361 and 362. The LCD panel 340 includes pixels 341, 342, 343 and 344.

The pixel 341 is electrically connected to the scan line 361 and the data line 351. The pixel 342 is electrically connected to the scan line 362 and the data line 351. The pixel 343 is electrically connected to the scan line 361 and the data line 352. The pixel 344 is electrically connected to the scan line 362 and the data line 352. The scan driver 330 controls the pixels 341 to 344.

By way of illustration, the timing controller 310 receives original pixel data D1 to D4 (not shown), which correspond to the target gray levels to be displayed by the pixels 341 to 344, respectively. In this example, pixels 341 and 343 are on the scan line 361 (i.e., a first pixel row) and pixels 342 and 344 are on the scan line 362 (i.e., a second pixel row that is adjacent to the first pixel row). The timing controller 310 outputs adjusted pixel data D1' to D4' (not shown) based on the original pixel data D1 to D4. The data driver 320 receives the adjusted pixel data D1' to D4' and respectively outputs adjusted pixel voltages V1' to V4' (not shown) corresponding to D1' and D4' to the pixels 341 to 344.

In this example, the original pixel data D1 and D2 are different from each other, and the original pixel data D3 and D4 are substantially the same. When the original pixel data D1 and D2 are different from each other and the original pixel data D3 and D4 are substantially the same, an average of original pixel voltages corresponding to the original pixel data D1 and D3 to be displayed by the pixels 341 and 343 located on the scan line 361 is different from an average of original pixel voltages corresponding to the original pixel data D2 and D4 to be displayed by the pixels 342 and 344 located on the scan line 362. As a result, the cross talk phenomenon may be generated, as will be discussed in further detail below. To address the cross-talk phenomenon, the timing controller 310 adjusts the original pixel data D1 to D4 such that the adjusted pixel data D1' and D2' are different from each other and the adjusted pixel data D3' and D4' are different from each other. Thus, the offset of the common voltage can be compensated and degradation of image quality due to the cross-talk phenomenon may be improved.

In an embodiment of the invention, and with reference still to FIG. 3, the original pixel data D1 to D4 are respectively the gray levels to be displayed by the pixels 341 to 344. However, the timing controller 310 does not directly output the original pixel data D1 to D4 to the data driver 320, but first adjusts the original pixel data D1 to D4 to compensate for the cross-talk phenomenon, and then outputs the adjusted pixel data D1' to D4' to the data driver 320. The data driver 320 outputs adjusted pixel voltages corresponding to the adjusted pixel data D1' to D4' to the pixels 341 to 344.

Figure 4:
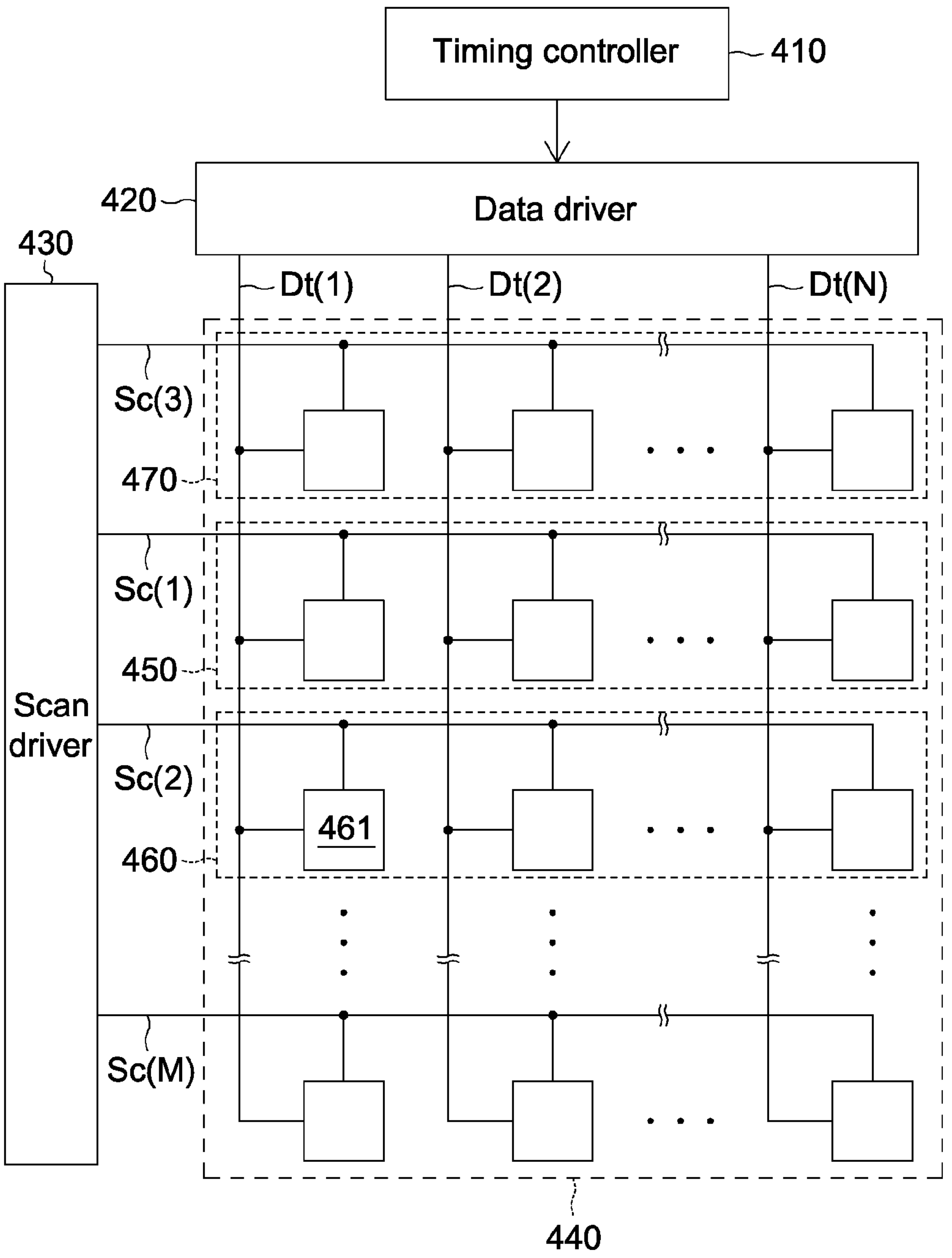
FIG. 4 is a block diagram showing an exemplary LCD system according to another embodiment of the invention.

FIG. 4 is a block diagram of an LCD system according to another embodiment of the invention. In FIG. 4, the LCD system includes a timing controller 410, a data driver 420, a scan driver 430, an LCD panel 440, data lines Dt(1) to Dt(N), and scan lines Sc(1) to Sc(M), wherein M and N are positive integers greater than 1 corresponding to the total number of scan line and the total number of data lines, respectively. As shown in FIG. 4, the LCD panel 440 includes multiple pixel rows each including multiple pixels.

Figure 5:
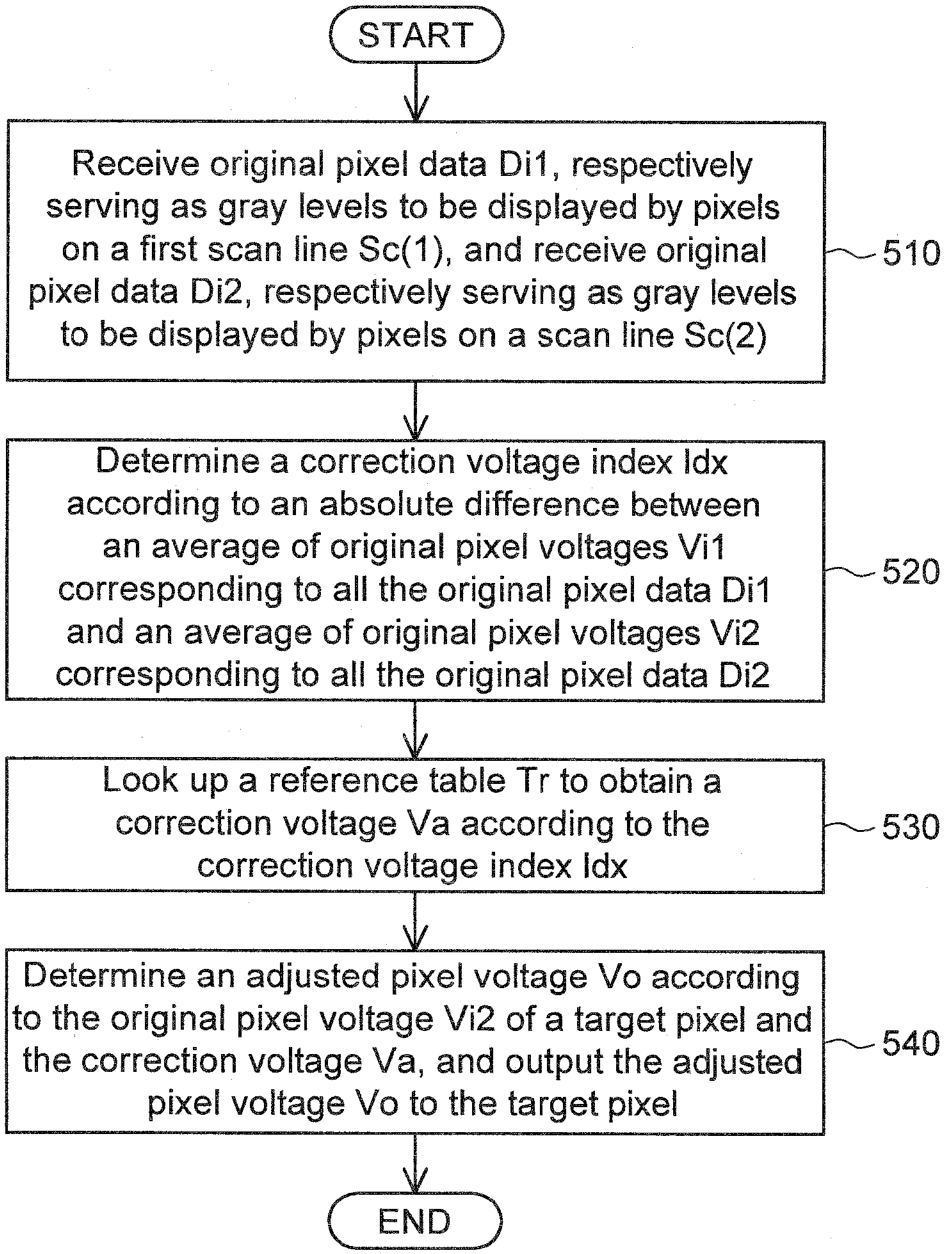
FIG. 5 is a flow chart showing an exemplary driving method of the LCD of FIG. 4, according to an embodiment of the invention.

FIG. 5 is a flow chart showing an exemplary driving method of the LCD system of FIG. 4, according to an embodiment of the invention. The driving method of this embodiment is adapted to output an adjusted pixel voltage to a target pixel. An example of the driving method of this embodiment will be described with reference to an exemplary target pixel 461 in the pixel row 460, which is electrically connected to the second scan line Sc(2) of the LCD panel 440.

As shown in FIG. 5, at step 510, the timing controller 410 receives a plurality of original pixel data Di1 (not shown), which respectively serve as the gray levels to be displayed by the pixels on the first scan line Sc(1) (i.e., the target gray levels to be displayed by the pixels in the pixel row 450), and receives a plurality of original pixel data Di2 (not shown), which respectively serve as the gray levels to be displayed by the pixels on the scan line Sc(2) (i.e., the target gray levels to be displayed by the pixels in the pixel row 460).

In step 520, the timing controller 410 determines a correction voltage index Idx (not shown) based on an absolute value of the difference between an average of the original pixel voltages Vi1 (not shown) corresponding to the original pixel data Di1 and an average of the original pixel voltage Vi2 (not shown) corresponding to the original pixel data Di2. For example, when each pixel row includes 1920 pixels, the sum of the original pixel voltages of all pixels in one pixel row is divided by 1920 to obtain the average of the original pixel voltages in the pixel row. The absolute value of the difference between the average voltages in the two pixel rows is then calculated and the correction voltage index Idx that corresponds to the absolute value of the difference is obtained.

In step 530, the timing controller 410 refers to a reference table Tr (not shown) to obtain a correction voltage Va (not shown) that corresponds to the correction voltage index Idx. Next, in step 540, based on the original pixel voltage Vi2 of the target pixel 461 and the correction voltage Va, the timing controller 410 determines an adjusted pixel voltage Vo. The data driver 420 outputs the adjusted pixel voltage Vo to the target pixel 461.

The driving method of this embodiment may reduce the cross-talk phenomenon of the LCD system. The cause of the cross talk phenomenon and the principle of the driving method of this embodiment will be described in the following non-limiting example. In this example, the LCD panel is a column inversion LCD, the original pixel data range from gray levels of 0 to 255, the positive original pixel voltages corresponding to the positive gray levels of 0 to 255 (hereinafter referred to as +0 to +255) range between 6V and 12V, the negative original pixel voltages corresponding to the negative gray levels of 0 to 255 (hereinafter referred to as −0 to −255) range between 6V and 0V, and the level of the common voltage Vcom (i.e., the voltage on the common electrode) (not shown) is 6V.

Figure 6A:
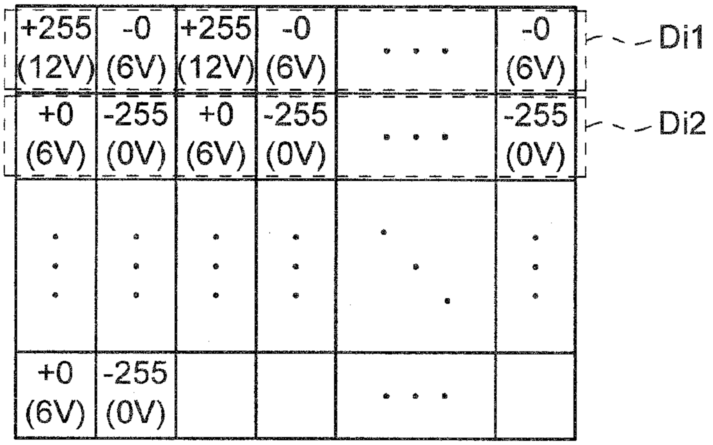
FIG. 6A shows original pixel data inputted to a timing controller 410 according to an example of the invention.

FIG. 6A shows original pixel data inputted to the timing controller 410 according to an example of the invention. The pixel voltages corresponding to the original pixel data are shown in parentheticals. As shown in FIG. 6A, the original pixel data Di1 corresponding to the pixel row 450 are alternately the gray levels of +255 and −0, respectively corresponding to the original pixel voltages Vi1 of 12V and 6V. The original pixel data Di2 corresponding to the pixel row 460 are alternately the gray levels of +0 and −255, respectively corresponding to the original pixel voltages Vi2 of 6V and 0V.

Figure 6B:
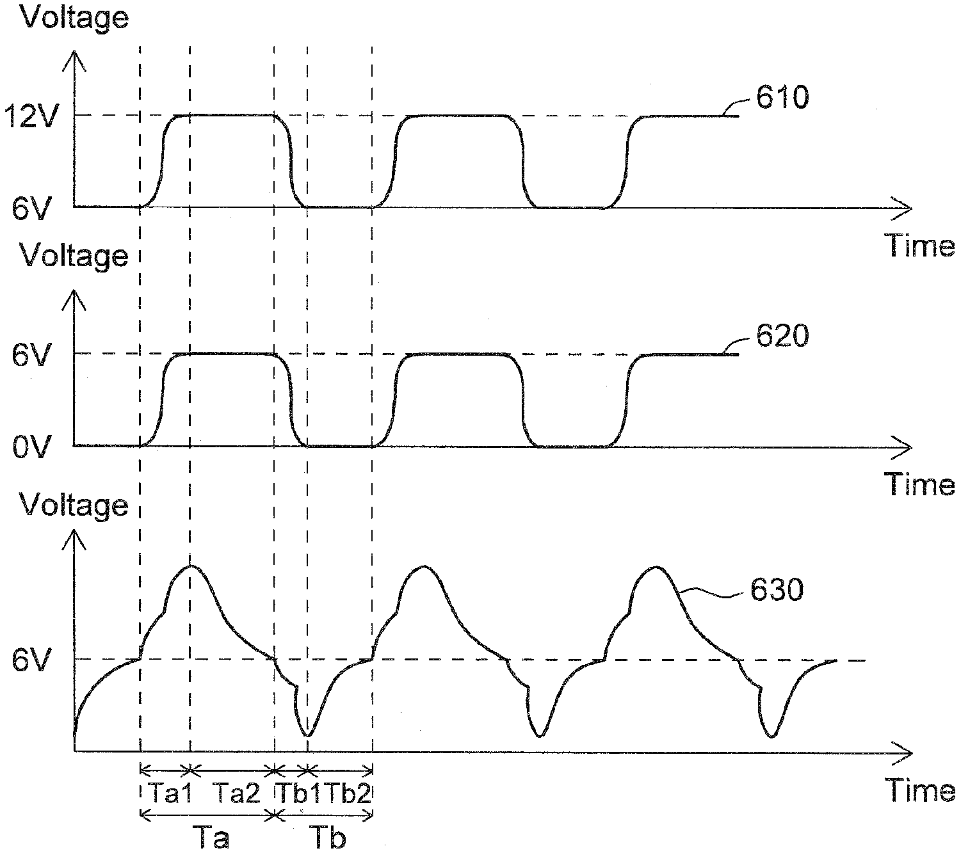
FIG. 6B shows waveforms of voltage variations of a first data line Dt(1), a second data line Dt(2) and a common voltage Vcom when an original pixel voltage corresponding to the original pixel data of FIG. 6A is directly inputted to each pixel of FIG. 4.

FIG. 6B shows waveforms of voltage variations of the first data line Dt(1), the second data line Dt(2) and the common voltage Vcom when the original pixel voltage corresponding to the original pixel data of FIG. 6A is directly inputted to each pixel of FIG. 4. In FIG. 6B, the curve 610 represents the voltage waveform on the first data line Dt(1), the curve 620 represents the voltage waveform on the second data line Dt(2), and the curve 630 represents the voltage waveform of the common voltage Vcom on the common electrode.

As shown in FIGS. 6A and 6B, it is assumed that each data line directly transmits the original pixel voltage Vi1 corresponding to each of the original pixel data Di1 to the pixel row 450 in the time interval Ta. In this case, the voltage on each data line is either increased from 6V to 12V or increased from 0V to 6V. For example, as shown in FIG. 6B, the curve 610 increases from 6V to 12V, and the curve 620 increases from 0V to 6V in the time interval Ta1. That is, in the time interval Ta1, the voltage on the data line Dt(1) is the pixel voltage corresponding to the original pixel data Di1 of the gray level +255, and the voltage on the data line Dt(2) is the pixel voltage corresponding to the original pixel data Di1 of the gray level −0.

Figures 1A, 1B:
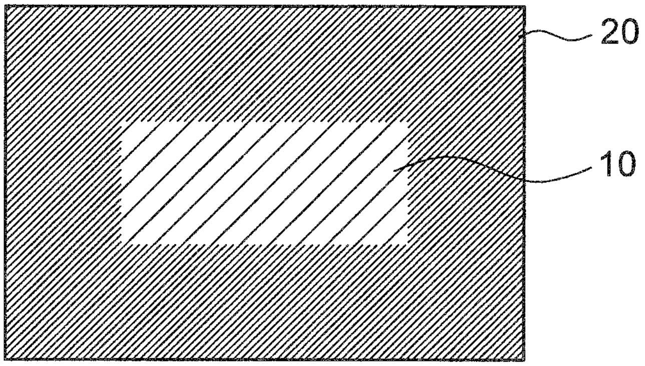
FIG. 1A (PRIOR ART)
FIG. 1B (PRIOR ART)
FIG. 1A (Prior Art) shows an example of an image to be displayed by a conventional LCD.
FIGS. 1B and 1C (Prior Art) show displayed gray levels of pixels in regions 10 and 20, respectively.
Figures 1C, 1D:
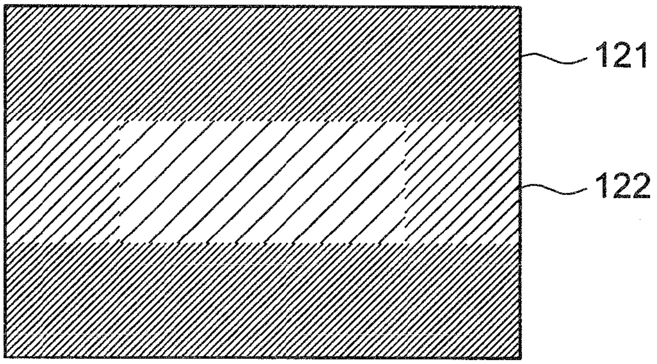
FIG. 1C (PRIOR ART)
FIG. 1D (PRIOR ART)
FIG. 1D (Prior Art) shows an image actually displayed by the conventional LCD.
Figure 2:
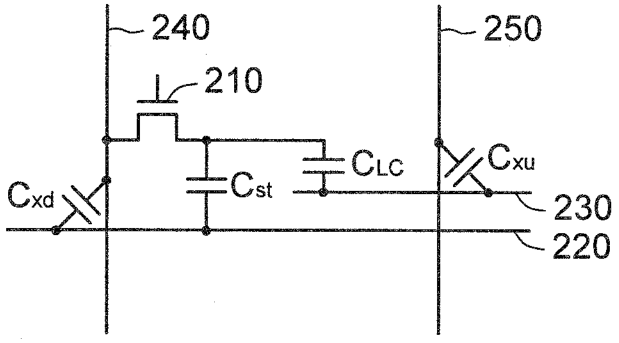
FIG. 2 (PRIOR ART)
FIG. 2 (Prior Art) is a circuit diagram of a pixel of an LCD.

As shown in FIG. 2, parasitic capacitors Cxd and Cxu are formed between each data line and the common electrode of the lower substrate 220 and the upper substrate 230. A capacitor generally has the property of maintaining the voltage across two terminals. Thus, when the voltage at one terminal of the parasitic capacitor (i.e., the voltage on the data line) fluctuates upwards or downwards, the voltage at the other terminal of the parasitic capacitor (i.e., the level of the common voltage of the common electrode) fluctuates upwards or downwards therewith. Thus, the voltage on each data line influences the level of the common voltage of the lower substrate and the upper substrate.

In the time interval Ta1, the voltage on each data line is either increased from 6V to 12V or increased from 0V to 6V. In other words, the average of the original pixel voltages in the pixel row 450 is greater than 6V, and is assumed to be equal to 9V. Thus, as a whole, on the junction between the time intervals Ta1 and Ta2 of the time interval Ta when the voltage on each data line is changed, the level of the common voltage Vcom at the common electrode is higher than 6V and approaches 9V, as shown in the curve 630.

Similarly, in the time interval Tb, each data line outputs the original pixel voltage Vi2 corresponding to the original pixel data Di2 to each pixel in the pixel row 460. In FIG. 6A, the original pixel data Di2 are alternately the gray levels of +0 and −255. Thus, the voltage on each data line is either decreased from 12V to 6V or decreased from 6V to 0V. In other words, in the time interval Tb, the average of the original pixel voltages on all the data lines is less than 6V and is assumed to be 3V. For example, as shown in the curve 610, the voltage on the data line Dt(1) is the original pixel voltage corresponding to the gray level +0 and is equal to 6V in the time interval Tb. As shown in the curve 620, the voltage on the data line Dt(2) is the original pixel voltage corresponding to the gray level of −255 and is equal to 0V in the time interval Tb. Thus, as a whole, on the junction between the time intervals Tb1 and Tb2 of the time interval Tb when the voltage on each data line is changed, the level of the common voltage Vcom at the common electrode is influenced and thus lower than 6V and approaches 3V, as shown in the curve 630.

In general, both the common electrodes 220 and 230 are electrically connected to an external common voltage source. Thus, when the level of the common voltage Vcom is offset, the external common voltage source can adjust the common voltage Vcom back to the correct level. Thus, in the curve 630, the level of the common voltage Vcom returns to 6V in the rear section of the time interval Ta2 of the time interval Ta and the rear section of the time interval Tb2 of the time interval Tb.

As shown in FIG. 6B, the average of the original pixel voltages Vi1 on all the data lines in the time interval Ta is greater than the average of the original pixel voltages Vi2 on all the data lines in the time interval Tb. Thus, the level of the common voltage Vcom is changed from the level higher than 6V to the level lower than 6V. For example, the level of the common voltage Vcom is offset from the pixel voltage average of about 9V, which corresponds to the original pixel data Di1 in the pixel row 450, to the pixel voltage average of about 3V, which corresponds to the original pixel data Di2 in the pixel row 460.

Thus, when the averages of the original pixel voltages corresponding to the received original pixel data in the adjacent pixel rows 450 and 460 are not the same, the level of the common voltage is offset. As a result, the common voltage cannot be maintained at the correct level of 6V if the original pixel voltage corresponding to the original pixel data is directly inputted to each pixel. As can further be seen from this example, the offset of the common voltage Vcom from the time interval Ta to the time interval Tb relates to the absolute value of the difference between the averages of the original pixel voltages corresponding to the original pixel data in the adjacent pixel rows 450 and 460.

To further illustrate, in the pixel circuit of FIG. 2, for example, when the transistor 210 in the pixel is turned on and the level of the common voltage Vcom is incorrect, the voltage stored in the storage capacitor Cst and the liquid crystal capacitor CLC is not the predetermined value that corresponds to the target gray level. Thus, the pixel cannot display the target gray level.

Figure 7A:
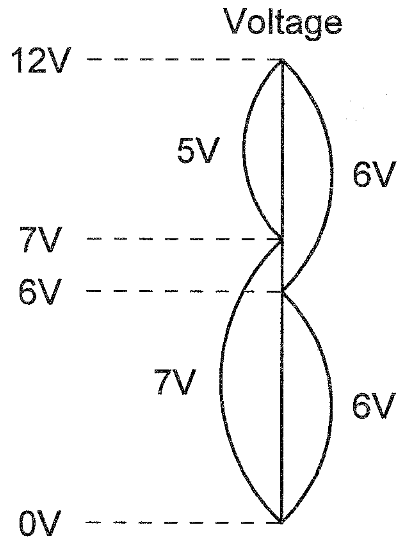
FIG. 7A illustrates the relationships between positive and negative original pixel voltages Vi2 and a common voltage when a transistor of a target pixel is enabled and the common voltage is higher than a correct level, according to an example of the invention.

The driving method of this embodiment will be further described in detail with reference to FIGS. 7A and 7B. FIG. 7A is a schematic illustration showing relationships between the positive and negative original pixel voltages Vi2 and the common voltage Vcom when the transistor of the target pixel 461 is enabled and the common voltage Vcom is higher than a correct level of 6V.

As an example, if the timing controller 410 outputs the pixel data corresponding to the positive gray level of +255 to the data driver 420, the pixel voltage outputted from the data driver 420 is 12V. If the common voltage Vcom is the correct level of 6V, the voltage stored in the storage capacitor and the liquid crystal capacitor of the target pixel 461 is 6V. Accordingly, the liquid crystal molecules of the target pixel 461 sense the voltage of 6V stored in the storage capacitor, and the target pixel 461 displays the brightness with the gray level of 255.

However, when the common voltage Vcom is offset upwards due to the cross-talk phenomenon (e.g., the common voltage Vcom is offset to 7V, as shown in FIG. 7A), if the timing controller 410 still outputs the pixel data corresponding to the positive gray level of +255 and the data driver 420 still outputs the pixel voltage of 12V, then the voltage stored in the storage capacitor and the liquid crystal capacitor of the target pixel 461 is only 5V. Consequently, the voltage actually encountered by the liquid crystal molecules is only 5V, which is lower than the voltage that corresponds to the gray level of +255 so that the brightness displayed by the target pixel 461 is lower than the gray level of +255. Thus, when the common voltage Vcom is offset in the positive direction and the original pixel data of the target pixel is of the positive gray level, the pixel voltage corresponding to the original pixel data should be adjusted to be higher. As a result of this adjustment, the voltage across capacitors Cst and CLC will be approximately 6V.

On the other hand, if the timing controller 410 outputs pixel data corresponding to the negative gray level (e.g., the pixel data with the level of −255) to the data driver 420, the pixel voltage outputted from the data driver 420 is 0V. Similarly, when the common voltage Vcom is the correct level of 6V, the voltage stored in the storage capacitor and the liquid crystal capacitor of the pixel 461 is 6V. That is, the liquid crystal molecules of the pixel 461 sense the voltage of 6V. Thus, the pixel 461 displays the brightness corresponding to the gray level of −255.

However, when the common voltage Vcom is offset upwards to, for instance, 7V, because of the cross-talk phenomenon, if the timing controller 410 still outputs the pixel data corresponding to the negative gray level of −255 and the data driver 420 still outputs the pixel voltage of 0V, then the voltage stored in the storage capacitor and the liquid crystal capacitor is 7V. Thus, the voltage actually encountered by the liquid crystal molecules is 7V, which exceeds the voltage corresponding to the gray level of −255. Hence, the brightness displayed by the target pixel 461 is higher than the negative gray level −255. Thus, when the common voltage Vcom is offset in the positive direction and the original pixel data of the target pixel is the negative gray level, the pixel voltage corresponding to the original pixel data should be adjusted to be higher (e.g., 1V instead of 0V). As a result of the adjustment, the voltage between the adjusted pixel voltage and the common voltage approximates the pixel voltage (i.e., 6V) that corresponds to the target gray level.

When the average of the original pixel voltages Vi2 is higher than the average of the original pixel voltages Vi1, the level of the common voltage Vcom offsets upwards, with the offset relating to the absolute value of the difference between the averages of the original pixel voltages Vi1 and Vi2. Thus, when the average of the original pixel voltages Vi2 is higher than the average of the original pixel voltages Vi1, the original pixel voltage Vi2 corresponding to the original pixel data Di2 is added to a correction voltage Va (i.e., which corresponds to the absolute value of the difference between the averages of the original pixel voltages Vi1 and Vi2) to generate an adjusted pixel voltage Vo so the pixel displays the desired gray level.

Thus, in accordance with an embodiment of the invention and with reference again to FIG. 5, in step 520, the timing controller 410 calculates the absolute value of the difference between the averages of the original pixel voltages Vi1 and Vi2 to determine a correction voltage index Idx. Next, in the step 530, the timing controller 410 refers to the reference table Tr to obtain the correction voltage Va that corresponds to the correction voltage index Idx. Again, the correction voltage Va relates to the absolute value of the difference between the averages of the original pixel voltages corresponding to the original pixel data Di2 and Di1. That is, the correction voltage Va relates to the amount of offset of the common voltage Vcom in the time intervals Ta and Tb. Next, in the step 540, the timing controller 410 generates the adjusted pixel voltage Vo by calculating the sum of the original pixel voltage Vi2 of the target pixel 461 and the correction voltage Va. The data driver 420 outputs the adjusted pixel voltage Vo to compensate for the upward offset of the level of the common voltage Vcom.

Figure 7B:
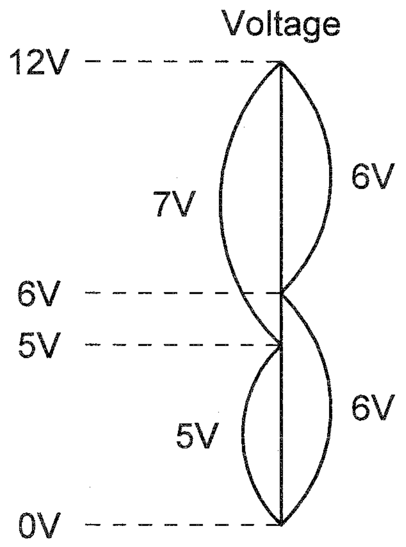
FIG. 7B illustrates the relationships between the positive and negative original pixel voltages Vi2 and the common voltage when the transistor of the target pixel is enabled and the level of the common voltage is lower than the correct level, according to an example of the invention.

FIG. 7B is a schematic illustration showing relationships between the positive and negative original pixel voltages Vi2 and the common voltage Vcom when the transistor of the target pixel 461 is enabled and the level of the common voltage Vcom is lower than the correct level of 6V.

Opposite to FIG. 7A, when the level of the common voltage Vcom offsets downwards because of the cross-talk phenomenon (it is assumed that the level of the common voltage Vcom is offset to 5V, as shown in FIG. 7B), if the timing controller 410 directly outputs the pixel data corresponding to the positive gray level of +255 and the data driver 420 still outputs the pixel voltage of 12V, then the voltage actually encountered by the liquid crystal molecules is higher than the voltage corresponding to the positive gray level of +255. Thus, the brightness displayed by the target pixel is higher than the gray level of 255. Consequently, when the common voltage Vcom offsets downwards and the original pixel data of the target pixel has the positive gray level, the pixel voltage corresponding to the original pixel data is adjusted to be lower. As a result, the voltage between the adjusted pixel voltage corresponding to the adjusted pixel data and the common voltage approximates to the 6V.

Referring still to FIG. 7B, when the level of the common voltage Vcom offsets downwards to 5V, if the timing controller 410 outputs the pixel data corresponding to the negative gray level of −255 and the data driver 420 correspondingly outputs the pixel voltage of 0V, then the voltage stored in the storage capacitor and the liquid crystal capacitor is 5V. Thus, the voltage actually encountered by the liquid crystal molecules is 5V, which is lower than the voltage of 6V which corresponds to the gray level of −255, so that the brightness displayed by the target pixel 461 is lower than the gray level of 255. Consequently, when the common voltage Vcom offsets downwards and the original pixel data of the target pixel is the negative gray level, the pixel voltage corresponding to the original pixel data has to be adjusted to be lower. Thus, the voltage between the adjusted pixel voltage and the common voltage approximates to the 6V.

When the average of the original pixel voltages Vi2 is lower than the average of the original pixel voltages Vi1, the level of the common voltage Vcom offsets downwards with the offset relating to the absolute value of the difference between the averages of the original pixel voltages Vi1 and Vi2. Thus, when the average of the original pixel voltages Vi2 is lower than the average of the original pixel voltages Vi1, the timing controller 410 subtracts the correction voltage Va from the original pixel voltage Vi2 corresponding to the original pixel data Di2 to obtain an adjusted pixel voltage Vo (as shown in step 540). In response, the data driver 420 outputs the adjusted pixel voltage Vo (which is less than the original pixel voltage Vi2) to compensate for the offset of the common voltage Vcom.

To summarize, under the premise that the level of the common voltage Vcom is increased by the original pixel data Di1 and Di2 in the pixel rows 450 and 460, the driving method of this embodiment adds the original pixel voltage Di2 to the correction voltage Va regardless of whether the original pixel data of the target pixel is of the positive or negative polarity. In addition, under the premise that the level of the common voltage Vcom is decreased by the original pixel data Di1 and Di2 in the pixel rows 450 and 460, the driving method of this embodiment subtracts the correction voltage Va from the original pixel voltage Di2 regardless of whether the original pixel data of the target pixel is of the positive polarity or the negative polarity.

As set forth above, the correction voltage Va is related to the amount of offset of the common voltage Vcom due to the cross-talk phenomenon. When the target pixel 461 receives the adjusted pixel voltage Vo, the voltage stored in the storage capacitor Cst and the liquid crystal capacitor CLC of the target pixel 461 is the voltage between the adjusted pixel voltage applied to the data line and the offset common voltage Vcom. Because of the adjustment, the voltage stored by the capacitors Cst and CLC is closer to the voltage required by the target pixel 461 to display each positive or negative gray level as compared with a conventional driving method in which no adjustment is made.

According to one embodiment, such as the embodiment described above, the reference table Tr maintains records the absolute value of differences between the averages of the original pixel voltages in adjacent pixel rows, which is representative of the relationship between the correction voltage index Idx and the correction voltage Va. The correction voltage index Idx is substantially directly proportional to the correction voltage Va. When the correction voltage index falls within a first range, the correction voltage falls within a second range corresponding to the first range. In this embodiment, the relationship between each correction voltage index and the correction voltage in the reference table Tr may be obtained by way of experimental measurements for a particular LCD panel. Alternatively, the values in the table Tr may be based on measurements of a representative LCD panel, may be determined by extrapolation or interpolation, or any combination thereof.

Figure 8A:
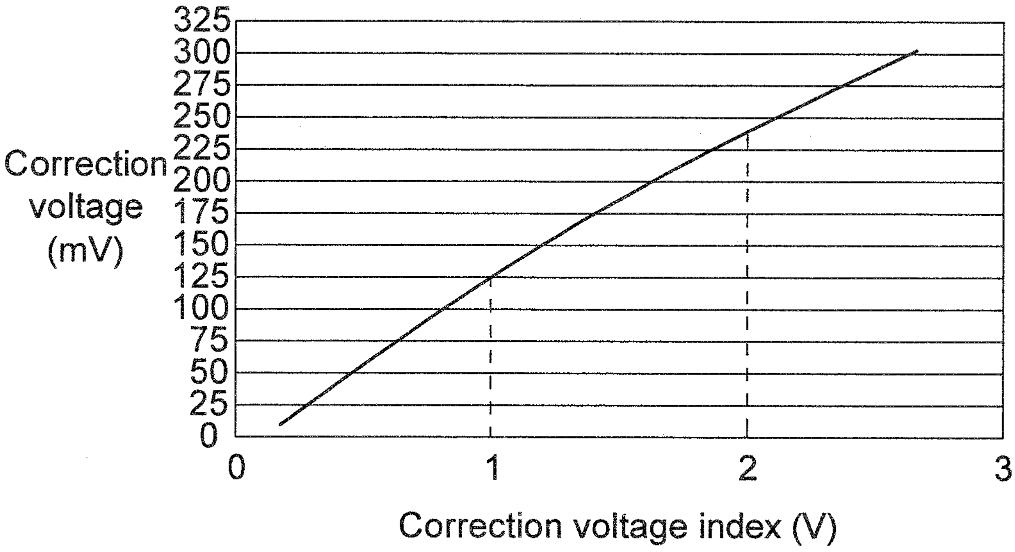
FIGS. 8A and 8B respectively show relationships between correction voltage indexes and correction voltages corresponding to exemplary reference tables of two different LCD panels, according to one example of the invention.
Figure 8B:
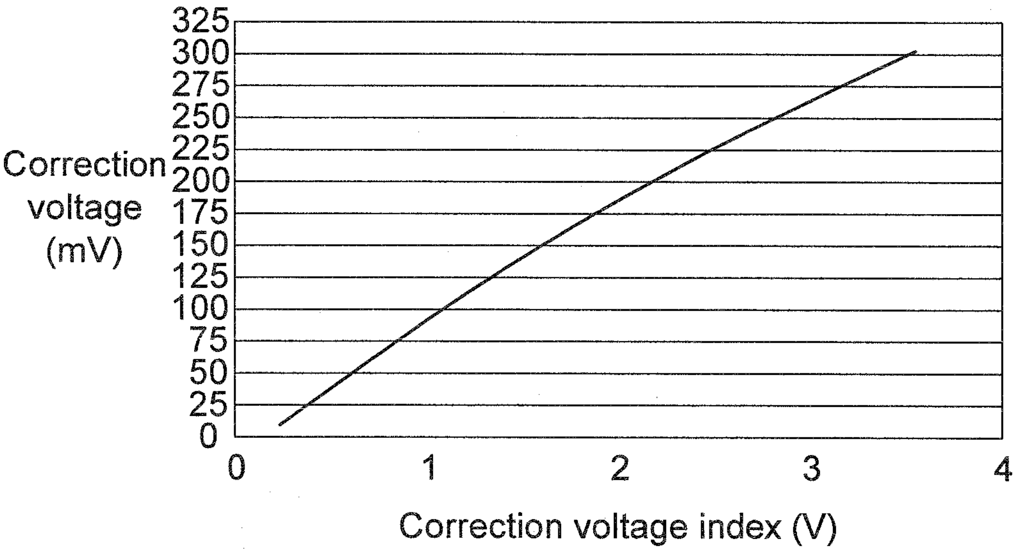

FIGS. 8A and 8B respectively show relationships between the correction voltage indexes Idx and the correction voltages Va corresponding to reference tables of two different LCD panels according to one example of the invention. In FIGS. 8A and 8B, the horizontal axis represents the correction voltage index (in volts (V)), and the vertical axis represents the correction voltage (in millivolts (mV)). In this example, the graphs of FIGS. 8A and 8B are obtained by way of experimental measurements of the two LCD panels.

As shown in FIGS. 8A and 8B, the correction voltage index Idx is substantially directly proportional to the correction voltage Va. In other words, when the absolute value of the difference between the averages of the original pixel voltages in adjacent pixel rows increases, the amount that the original pixel data needs to be adjusted also increases, and, in some embodiments, increases directly proportionally. As shown in FIG. 8A, for example, when the correction voltage index Idx ranges from 1V and 2V, the correction voltage Va ranges between 125 mV and 240 mV.

In some embodiments, the timing controller 410 may select one of several tables as the reference table Tr based on the row number of the LCD panel 440. Generally, the pixel rows of the LCD panel positioned in the lower portion of the LCD panel experience the greatest effect from the cross-talk phenomenon. As a result, when the absolute values of the differences between the averages of the original pixel voltages in adjacent pixel rows are the same (i.e., the correction voltage indexes are the same), the offset of the common voltage of the pixel row positioned in the lower portion of the LCD panel is larger. Hence, for the same correction voltage index, the amount of voltage adjustment needed for a target pixel located in the lower portion of the panel 440 is greater than the amount of voltage adjustment needed for a pixel in another portion of the panel 440.

For example, in one embodiment of the invention, the timing controller 410 may select between three potential reference tables. The first table is selected as the reference table Tr1 when the target pixel is electrically connected to one of the scan lines Sc(1) to Sc(M/3) of the LCD panel; the second table is selected as the reference table Tr2 when the target pixel is electrically connected to one of the scan lines Sc(M/3+1) to Sc(2M/3) of the LCD panel; and the third table is selected as the reference table Tr3 when the target pixel is electrically connected to one of the scan lines Sc(2M/3+1) to Sc(M) of the LCD panel, where M is the total number of pixel rows of the LCD panel. The correction voltage corresponding to a particular correction voltage index in the first table is less than the correction voltage corresponding to that correction voltage index in the second table. Similarly, the correction voltage corresponding to the correction voltage index in the second table is less than the correction voltage corresponding to the same correction voltage index in the third table.

In addition, it is also possible to create the reference tables corresponding to different pixel rows. Taking the LCD panel with the resolution of 1920×1080 as an example, reference tables corresponding to a first portion (e.g., 64 rows) of the 1080 pixel rows may be created, and the correction voltages of other pixel rows having no corresponding reference tables can be obtained by way of interpolation or extrapolation according to the known reference table and general knowledge of the variation of the liquid crystal capacitance across the LCD panel.

In addition, as shown in the examples of FIGS. 8A and 8B, the correction voltage index Idx has a defined relationship to the correction voltage Va (e.g., it is substantially directly proportional, for example). Thus, a general equation representing the relationship between the correction voltage index and the correction voltage can be derived. Thus, as an alternative to using lookup tables, the corresponding correction voltage for a pixel can be obtained by determining the correction voltage index and then using the appropriate equation.

In the embodiments described thus far, the timing controller 410 determines the correction voltage Va of the original pixel data of the pixel 461 based on the absolute value of difference between the averages corresponding to the original pixel data of the pixel rows 450 and 460. In other embodiments, the timing controller 410 may determine the correction voltage Va based on different parameters or additional parameters. For instance, in one embodiment, the timing controller 410 may refer to a reference table Tr' (not shown) to obtain the correction voltage Va based on both the correction voltage index and the sum of the equivalent capacitances in the pixel row 460 where the target pixel 461 is located.

In such an embodiment, the reference table Tr' maintains the relationships among the equivalent capacitance, the correction voltage Va, and the absolute value of the difference between the averages of original pixel voltages in adjacent pixel rows. In this embodiment, the reference table Tr' is obtained by way of experimental measurements. In other embodiments, the values in the table Tr' may be based on measurements of a representative LCD panel, may be determined by extrapolation or interpolation, or any combination thereof.

The reason for the additional reference to the equivalent capacitance according to this embodiment will be described in the following example. Referring to FIG. 2, the common electrodes 220 and 230 are externally connected to a common voltage source (not shown). Thus, when the level of the common voltage Vcom is offset, the externally connected common voltage source attempts to adjust the common voltage Vcom back to the correct level. However, when the equivalent RC effect of the common electrode increases, the time required for the common voltage source to pull the common voltage Vcom back to the correct level likewise increases. In other words, when the equivalent capacitance of the pixel row 460 where the target pixel 461 is located increases, the common voltage Vcom is pulled back to the correct level more slowly. To compensate for this, the timing controller 410 refers to the reference table Tr' to obtain a correction voltage Va for the target pixel 461 that is based on both the equivalent capacitance in the pixel row 460 and the correction voltage indexes Idx in the corresponding pixel rows 450 and 460. In this example, the equivalent capacitance in the pixel row 460 is directly proportional to the correction voltage of the reference table Tr'. In addition, the relationship between each correction voltage index and the correction voltage in the reference table Tr' may be obtained by way of experimental measurements. Alternatively, the values in the table Tr' may be based on measurements of a representative LCD panel, may be determined by extrapolation or interpolation, or any combination thereof.

In this example, the sum of the equivalent capacitances in the pixel row 460 is the sum of the storage capacitances Cst and the liquid crystal capacitances $C_{LC}$ of all the pixels in the pixel row 460. In the pixel row 460, the storage capacitances Cst of all the pixels are constant, and the liquid crystal capacitance $C_{LC}$ of each pixel corresponds to the voltage encountered by the liquid crystal molecules of each pixel. In this embodiment, the timing controller 410 determines the liquid crystal capacitance $C_{LC}$ that corresponds to each pixel according to the original pixel data of each pixel in the pixel row 460. Taking the original pixel data Di2 in the pixel row 460 of FIG. 6A as an example, the liquid crystal capacitance $C_{LC}$ corresponding to the original pixel data having the gray level of +255 is 0.5 picofarads (pF), while the liquid crystal capacitance corresponding to the original pixel data having the gray level of +0 is 0.3 pF. The timing controller 410 sums the storage capacitance Cst and the liquid crystal capacitance $C_{LC}$ of each pixel in the pixel row 460 to obtain the equivalent capacitance in the pixel row 460.

To summarize, in the embodiment just described, the timing controller 410 determines the correction voltage index by calculating the absolute value of the difference between the averages of the original pixel voltages corresponding to the original pixel data of the pixels in adjacent pixel rows; obtains the equivalent capacitance in the pixel row where the target pixel is located according to the storage capacitance Cst of each pixel in the pixel row where the target pixel is located and the liquid crystal capacitance $C_{LC}$ corresponding to the original pixel data; and obtains the correction voltage corresponding to the target pixel by further looking up the reference table Tr' according to the correction voltage index and the equivalent capacitance. In this embodiment, the timing controller 410 adds the correction voltage to the original pixel voltage of the target pixel or subtracts the correction voltage from the original pixel voltage of the target pixel to obtain the adjusted pixel voltage of the target pixel in the same manner as described above.

Similar to the other embodiments described above, the timing controller 410 may also select one of multiple tables as the reference table Tr' according to the row number of the LCD panel 440 in which the target pixel is located.

In some embodiments, other phenomenon may affect the actual voltage that is provided to a target pixel. As one example, a feed-through effect resulting from the physical connections of the data line to the target pixel may influence the actual voltage output by each data line. For instance, the actual voltage applied to the target pixel may actually be less than the voltage output by the data driver 320. Since the amount of offset of the common voltage Vcom is related to the voltages on the data lines, the feed-through effect also influences the amount of offset of the common voltage Vcom due to the cross-talk phenomenon. Thus, the original pixel voltage corresponding to the original pixel data of each pixel is the effective pixel voltage, which is obtained by subtracting the feed-through voltage corresponding to the original pixel data of each pixel from the voltage outputted by the data driver 420 according to the original pixel data of each pixel in the embodiments described above. In other words, the feed-through effect is also taken into account when determining the adjusted output voltage Vo.

Figure 9:
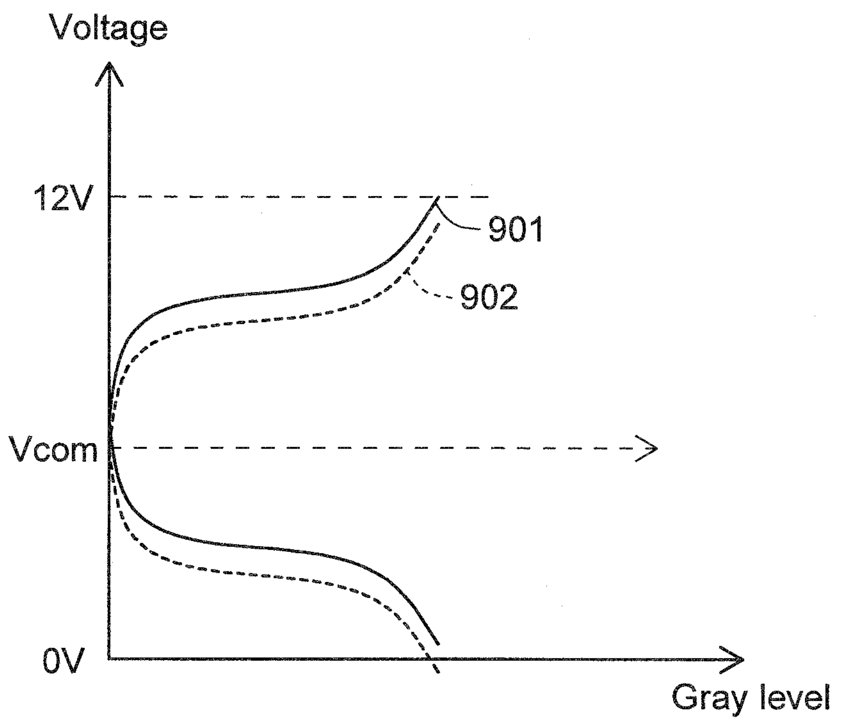
FIG. 9 shows the relationship between the driving voltage, which is outputted from the data driver of FIG. 4, and the gray level, and the relationship between the original pixel voltage, which is obtained by subtracting the feed-through voltage from the driving voltage, and the gray level, according to one example of the invention.

As an example, FIG. 9 shows the relationship among the driving voltage, which is outputted from the data driver 420 of FIG. 4, the gray level, and the original pixel voltage, which is obtained by subtracting the feed-through voltage from the driving voltage. In FIG. 9, the horizontal axis represents the gray level, and the vertical axis represents voltage. In FIG. 9, the curve 901 indicates the relationships between different gray levels and the driving voltages outputted from the data driver 320, while the curve 902 indicates the relationships between each gray level and the effective pixel voltage, which is obtained by subtracting the feed-through voltage corresponding to each gray level from the driving voltage. The common voltage Vcom is determined based on the curve 902. The effective pixel voltage converted via the curve 902 is the voltage actually received by the storage capacitor Cst and the liquid crystal capacitor $C_{LC}$ of the pixel circuit. In some embodiments of the invention, the effective pixel voltage obtained from the original pixel data of each pixel via the conversion of the curve 902 preferably serves as the original pixel voltage corresponding to the original pixel data of each pixel. Thus, the obtained correction voltage can be closer to the actual offset of the common voltage.

In the embodiments described above, the driving method has been described with respect to the target pixel 461, which is located in the pixel row 460. The driving methods for other pixels on the LCD panel 440 are the same as that for the pixel 461, so detailed descriptions thereof will be omitted.

Figure 10:
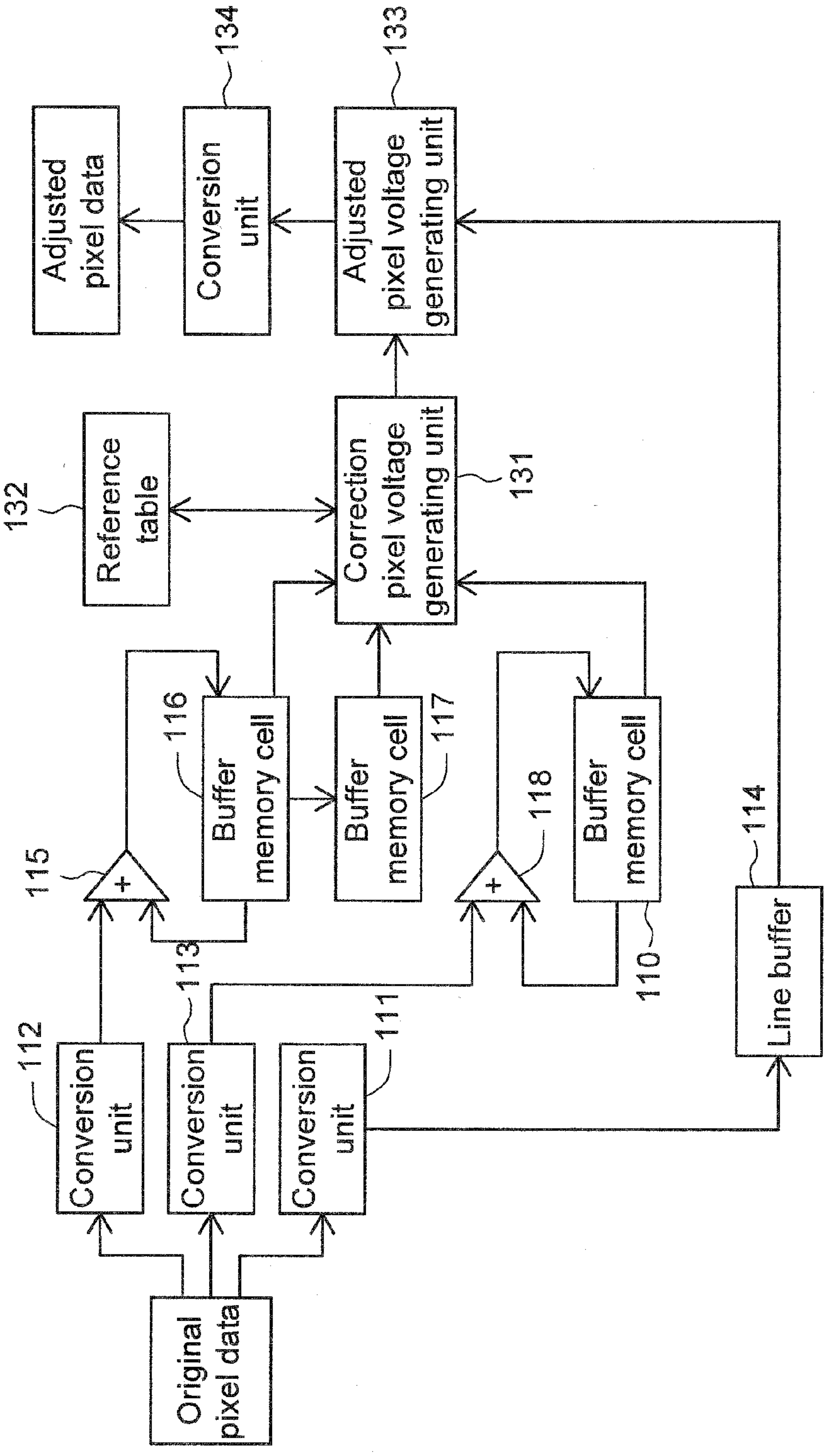
FIG. 10 shows a block diagram of an exemplary LCD system, according to an embodiment of the invention.

FIG. 10 shows a hardware circuit layout according to the embodiment of the invention and illustrates how to determine the adjusted pixel data in the Nth pixel row (i.e., pixel row 450 in FIG. 4) as an example. First, after the original pixel data is read, the effective pixel voltage corresponding to the original pixel data is obtained through a conversion unit 111, and the effective pixel voltage is stored in a line buffer 114. In addition, the original pixel voltage corresponding to the original pixel data is obtained through a conversion unit 112, and the liquid crystal capacitance corresponding to the original pixel data is obtained through a conversion unit 113. Thereafter, the sum of all pixel voltages in the Nth pixel row (i.e., pixel row 450 in FIG. 4) is calculated by an adder 115 and a buffer memory cell 116, and the sum of all pixel voltages of the (N−1)th pixel row (i.e., the previous pixel row 470 in FIG. 4) stored in a buffer memory cell 117 is read, and the sum of the equivalent capacitances in the Nth pixel row (i.e., pixel row 450 in FIG. 4) is calculated by an adder 118 and a buffer memory cell 119. A correction pixel voltage generating unit 131 determines the corresponding correction voltage index and thus obtains the correction voltage with reference to a reference table 132 according to an absolute value of difference between the sum of all pixel voltages in the Nth pixel row (i.e., pixel row 450 in FIG. 4) and the sum of all pixel voltages in the (N−1)th pixel row (i.e., the previous pixel row 470 in FIG. 4), and the sum of the equivalent capacitances of the Nth pixel row (i.e., pixel row 450 in FIG. 4). Next, an adjusted pixel voltage generating unit 133 reads the effective pixel voltage memorized in the line buffer 114, and obtains the adjusted pixel voltage according to the correction voltage. Thereafter, a conversion unit 134 converts the adjusted pixel voltage into the adjusted pixel data.

When the voltage on each data line is changed, the common voltage on the common electrode of the LCD is influenced and thus offset. When each data line outputs the pixel voltage to a pixel row, the offset of the common voltage relates to the absolute value of difference between the averages of the original pixel voltages corresponding to the original pixel data in this pixel row and the adjacent previous pixel row. In addition, the external common voltage source corrects the common voltage from the offset level to the correct level at a speed relating to the sum of the equivalent capacitances in the scanned pixel row. Thus, the LCD according to embodiment of the invention looks up the reference table to obtain the correction voltage according to the absolute value and the sum of the equivalent capacitances, and adjusts the original pixel data according to the correction voltage so that the offset of the common voltage can be effectively compensated. Thus, the voltage stored in the liquid crystal capacitor and the storage capacitor of each pixel can satisfy the target gray level (i.e., the voltage required by the original pixel data) to be displayed by each pixel and the cross talk phenomenon of the LCD can be effectively reduced.

Figure 11:
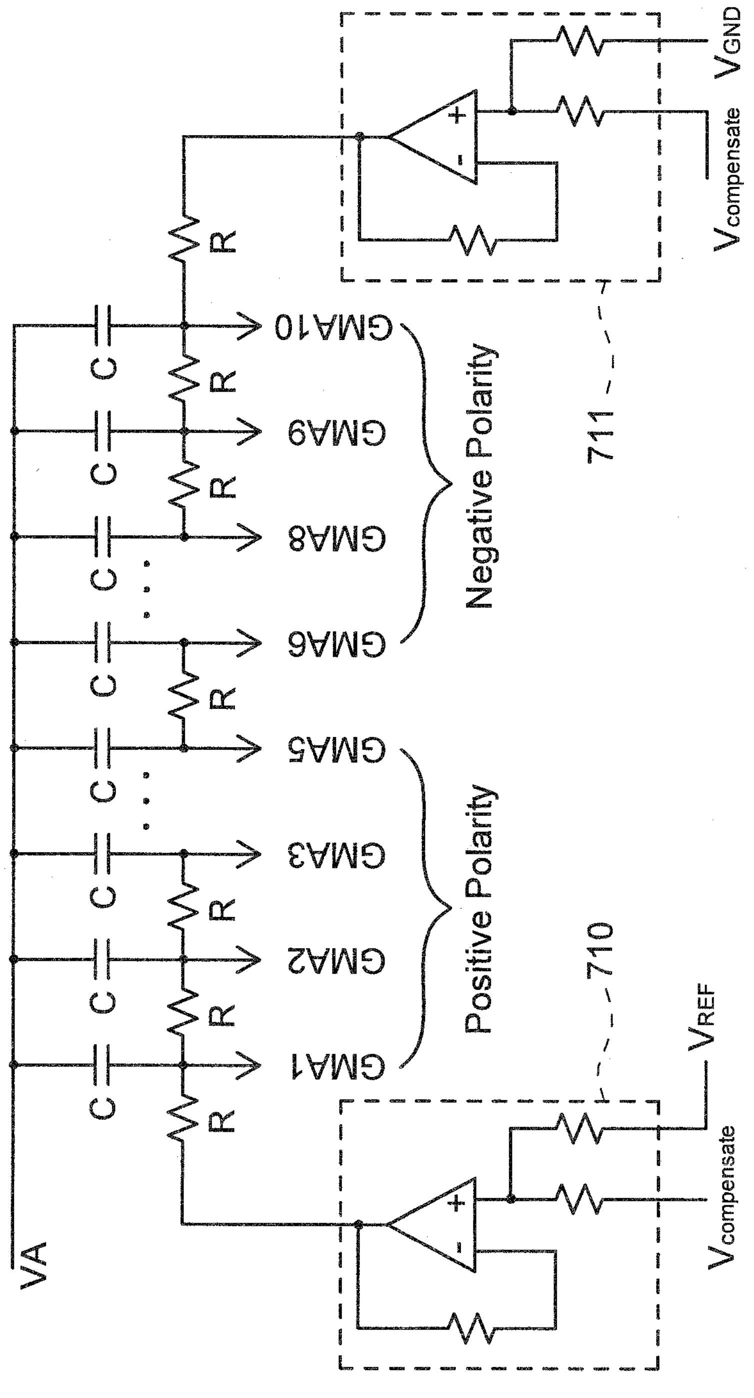
FIG. 11 shows a schematic view of an exemplary LCD system, according to one embodiment of the invention.

In another embodiment of the invention, and as shown in FIG. 11, the LCD system may include a gamma generator circuit to compensate for the voltage offset of the common electrode caused by the cross-talk phenomenon. The gamma generator of FIG. 11 includes a resistor string having ends respectively connected to variable voltage sources 710 and 711. In the embodiment shown, the circuit 710 provides an adjusted voltage to one end of the resistor string based on a correction voltage, Vcompensate and a reference voltage Vref. Circuit 711 provides an adjusted voltage to the other end of the resistor string based on the correction voltage, Vcompensate, and ground. In some embodiments, the correction voltage, Vcompensate, is generated in the manner described above (i.e., based on the difference between the average voltages in adjacent pixel rows). As shown in FIG. 11, the gamma generator provides gamma voltages GMA1-GMA10 to a data driver (e.g., data driver 803 in FIG. 12). Based on the gamma voltages, the data driver generates corresponding pixel voltages. In this manner, adjusting the voltage sources 710 and 711 based on the correction voltage results in compensation of the voltage offset of the common electrode caused by the cross-talk phenomenon.

Figure 12:
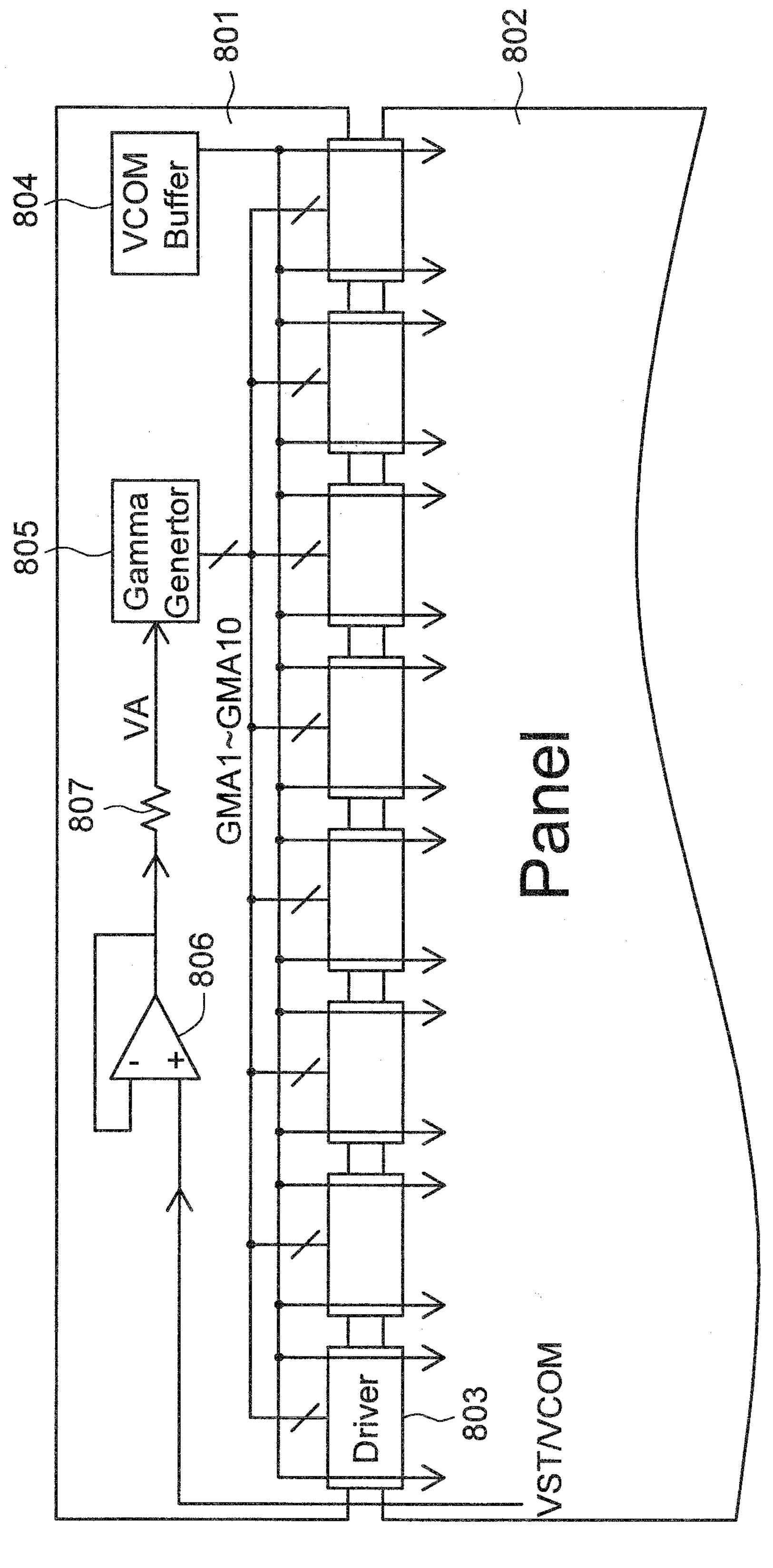
FIG. 12 is an exemplary LCD system according to another embodiment of the invention.

FIG. 12 shows an exemplary LCD system according to another embodiment of the invention. Here, the LCD system includes an LCD panel 803 having a plurality of pixels with pixel circuits similar to that shown in FIG. 2. A plurality of data drivers 803 provides driving voltage signals to the plurality of pixels according to the image data signal from a video source (not shown in the figure) and a plurality of gamma voltages GMA1-GMA10 from the gamma generator 805, which is located on a printed circuit board 801. Also on printed circuit board 801 is a VCOM buffer which functions as a voltage power source that provides a stable voltage to the common electrode on the upper or lower substrate of the panel 802. In this embodiment, a signal VA is generated based on the variation of the common electrode and is provided as an input to the gamma generator. In some embodiments, the signal VA may be a feedback signal VCOM from the common electrode on the upper substrate. In other embodiments, the signal VA is a feedback signal VST from the common electrode on the lower substrate. As shown in the example of FIG. 12, the signal VA passes through an operational amplifier 806, which functions as a buffer, and a resistor 807, which functions as a low-pass filter, and is then provided as an input to the gamma generator 805.

Figure 13:
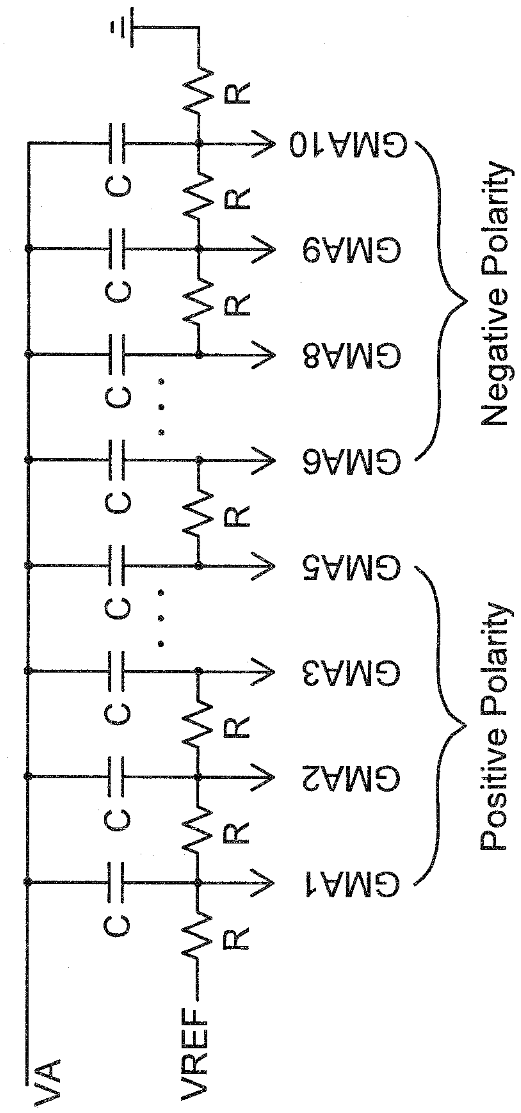
FIG. 13 is an exemplary embodiment of a gamma generator circuit that may be used in the system of FIG. 12.
Figure 14:
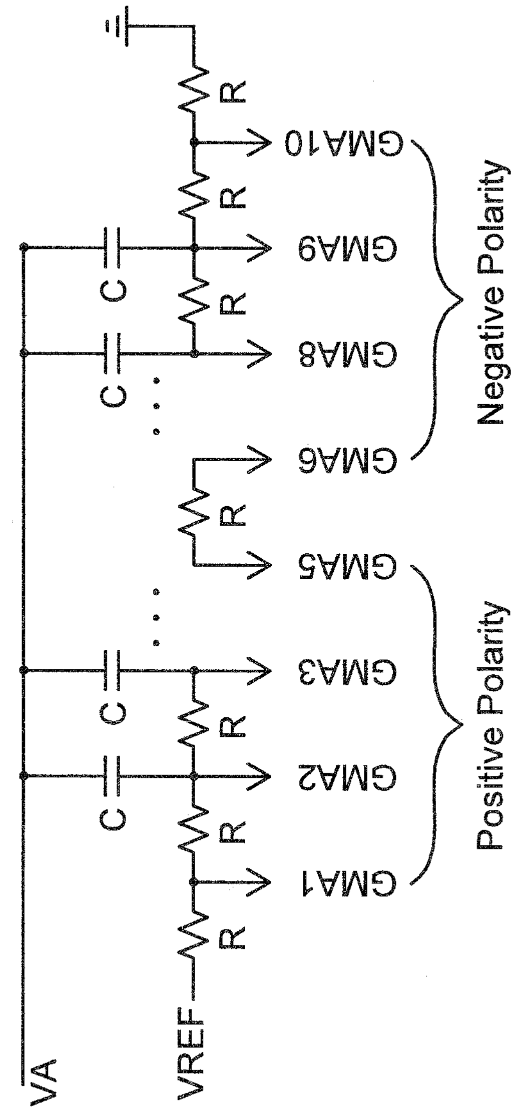
FIG. 14 is another exemplary embodiment of a gamma generator circuit that may be used in the system of FIG. 12.

FIG. 13 and FIG. 14 respectively show two exemplary circuits of the gamma generator 805 of FIG. 12. The gamma generator of FIG. 13 includes a resistor string having ends respectively connected to a reference voltage source VREF and ground. In this example, the gamma generator includes ten nodes that provide ten gamma voltages GMA1-GMA10. As shown in FIGS. 13 and 14, GMA1-GMA5 correspond to positive polarity gray-levels, and GMA6-GMA10 correspond to negative polarity gray-levels. The resistances of the plurality of resistors R may be selected based on the required gamma voltages and might be the same values or different values depending on the particular application in which the gamma generator is implemented. The feedback signal VA is coupled to each of the nodes via a plurality capacitors C respectively.

The gamma generator of FIG. 14 is similar to that of FIG. 13 except that the nodes that provide gamma voltages GMA1, GMA5, GMA6, and GMA10 are not coupled to the feedback signal VA via capacitors C. In this embodiment, the pure black gray-level and pure white gray-level will not be affected by the feedback signal, because the gamma voltages for pure black/white gray-level, GMA1, GMA5, GMA6, GMA10 are not adjusted based on the feedback signal VA.

In other embodiments, one or both of the ends of the resistor strings of the gamma generators of FIGS. 13 and 14 may be coupled to adjustable voltage sources (rather than fixed voltage sources VREF and ground) in a manner similar to that shown in FIG. 11 to provide additional flexibility in compensating for the cross-talk phenomenon.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD), comprising:

a first data line;

a second data line;

a first scan line;

a second scan line;

a third scan line, wherein the first scan line is located between the second scan line and the third scan line;

a common electrode;

an LCD panel, which comprises:

a first pixel electrically connected to the first scan line and the first data line;

a second pixel electrically connected to the second scan line and the first data line;

a third pixel electrically connected to the first scan line and the second data line; and a fourth pixel electrically connected to the second scan line and the second data line;

a scan driver for controlling the first to fourth pixels;

a timing controller for receiving first original pixel data, second original pixel data, third original pixel data and fourth original pixel data, which are respectively target gray levels to be displayed by the first to fourth pixels, wherein the first and second original pixel data are different from each other, the third and fourth original pixel data are substantially the same; and the timing controller is further for outputting first adjusted pixel data, second adjusted pixel data, third adjusted pixel data and fourth adjusted pixel data according to the first original pixel data, the second original pixel data, the third original pixel data and the fourth original pixel data, wherein the first and second adjusted pixel data are different from each other, and the third and fourth adjusted pixel data are different from each other to compensate for a common voltage offset on the common electrode; and a data driver for receiving the first to fourth adjusted pixel data and thus respectively outputting a first adjusted pixel voltage, a second adjusted pixel voltage, a third adjusted pixel voltage and a fourth adjusted pixel voltage to the first to fourth pixels, wherein, the first original pixel data and the first adjusted pixel data respectively correspond to a first original pixel voltage and the first adjusted pixel voltage;

the timing controller for determining a correction voltage index according to an absolute difference between an average of original pixel voltages corresponding to original pixel data of all pixels on the first scan line and an average of original pixel voltages corresponding to original pixel data of all pixels on the third scan line, obtaining a correction voltage, by means of table looking, according to the correction voltage index, determining the first adjusted pixel voltage according to the first original pixel voltage and the correction voltage, and outputting the first adjusted pixel data corresponding to the first adjusted pixel voltage; and the absolute difference between the average of original pixel voltages corresponding to original pixel data of all pixels in the first scan line and the average of original pixel voltages corresponding to original pixel data of all pixels on the third scan line relates to the common voltage offset on the common electrode; wherein the timing controller looks up a reference table to obtain the correction voltage according to the correction voltage index;

the timing controller selects one of a plurality of reference tables as the reference table according to a row number of the LCD panel where the target pixel is located;

when the first pixel is located in the ith row of the LCD panel, the timing controller is to select a first reference table as the reference table;

when the first pixel is located in a jth row of the LCD panel, the timing controller is to select a second reference table as the reference table;

the correction voltage corresponding to the correction voltage index in the first reference table is smaller than the correction voltage corresponding to the same correction voltage index in the second reference table; and "i" and "j" are positive integers, and "i" is smaller than "j", the jth row is located in a lower section of the LCD panel than the ith row.

2. The LCD according to claim 1, wherein:

the first to fourth original pixel data respectively correspond to the first original pixel voltage, a second original pixel voltage, a third original pixel voltage and a fourth original pixel voltage; and when an absolute difference between an average of original pixel voltages of the first and third pixels and an average of original pixel voltages of the second and fourth pixels falls within a first range, an absolute difference between the second original pixel voltage and the second adjusted pixel voltage falls within a second range corresponding to the first range, and an absolute difference between the fourth original pixel voltage and the fourth adjusted pixel voltage falls within the second range.

3. The LCD according to claim 1, wherein if the average of the original pixel voltages of all the pixels on the first scan line is smaller than the average of the original pixel voltages of all the pixels on the third scan line, the timing controller determines the first adjusted pixel voltage according to a difference between the first original pixel voltage and the correction voltage.

4. The LCD according to claim 1, wherein if the average of the original pixel voltages of all the pixels on the first scan line is greater than the average of the original pixel voltages of all the pixels on the third scan line, the timing controller determines the first adjusted pixel voltage according to a sum of the first original pixel voltage and the correction voltage.

5. The LCD according to claim 1, wherein the timing controller determines the correction voltage index according to the absolute difference between the average of the original pixel voltages corresponding to the original pixel data of all the pixels on the first scan line and the average of the original pixel voltages of all the pixels on the third scan line, looks up the reference table to obtain the correction voltage according to the correction voltage index and an equivalent capacitance on the first scan line, determines the first adjusted pixel voltage according to the first original pixel voltage and the correction voltage, and outputs the first adjusted pixel data corresponding to the first adjusted pixel voltage.

6. The LCD according to claim 1, wherein the timing controller selects a corresponding reference table from a plurality of reference according to a row number of the LCD panel where a target pixel is located, and obtains the correction voltage by way of interpolation.

7. A liquid crystal display (LCD), comprising:

an LCD panel, which comprises a first pixel row and a second pixel row;

a common electrode;

a scan driver for controlling the first and second pixel rows;

a timing controller for determining a correction voltage index according to an absolute difference between an average of original pixel voltages corresponding to original pixel data of all the pixels in the first pixel row and an average of original pixel voltages corresponding to original pixel data of all the pixels in the second pixel row, and obtaining a correction voltage, by means of table looking, according to the correction voltage index, the timing controller further for determining an adjusted pixel voltage of a target pixel according to an original pixel voltage of the target pixel in the second pixel row and the correction voltage, and outputting adjusted pixel data corresponding to the adjusted pixel voltage; and a data driver for outputting the adjusted pixel voltage to the target pixel according to the adjusted pixel data; wherein the absolute difference between the average of original pixel voltages corresponding to original pixel data of all the pixels in the first pixel row and the average of original pixel voltages corresponding to original pixel data of all the pixels in the second pixel row relates to a common voltage offset on the common electrode; wherein the timing controller looks up a reference table to determine the correction voltage according to the correction voltage index;

the timing controller selects one of a plurality of reference tables as the reference table according to a row number of the LCD panel where the target pixel is located;

when the target pixel is located in an ith row of the LCD panel, the timing controller is to select a first reference table as the reference table;

when the target pixel is located in a jth row of the LCD panel, the timing controller is to select a second reference as the reference table;

the correction voltage corresponding to the correction voltage index in the first reference table is smaller than the correction voltage corresponding to the same correction voltage index in the second reference table; and "i" and "j" are positive integers, and "i" is smaller than "j", the jth row is located in a lower section of the LCD panel than the ith row.

8. The LCD according to claim 7, wherein if the average of the original pixel voltages of all the pixels in the second pixel row is smaller than the average of the original pixel voltages of all the pixels in the first pixel row, the timing controller determines the adjusted pixel voltage of the target pixel according to a difference between the original pixel voltage of the target pixel and the correction voltage.

9. The LCD according to claim 7, wherein if the average of the original pixel voltages of all the pixels in the second pixel row is greater than the average of the original pixel voltages of all the pixels in the first pixel row, the timing controller determines the adjusted pixel voltage of the target pixel according to a sum of the original pixel voltage of the target pixel and the correction voltage.

10. The LCD according to claim 7, wherein the timing controller further looks up the reference table according to the correction voltage index and an equivalent capacitance in the second pixel row.

11. The LCD according to claim 7, wherein in the reference table, when the correction voltage index falls within a first range, the correction voltage falls within a second range corresponding to the first range.

12. The LCD according to claim 7, wherein the timing controller selects the corresponding reference table from a plurality of reference tables according to a row number of the LCD panel where the target pixel is located, and obtains the correction voltage by way of interpolation.

13. The LCD according to claim 7, wherein each of the original pixel voltages corresponding to the original pixel data of the pixels in the first and second pixel rows is an effective pixel voltage, which is obtained by subtracting a feed-through voltage corresponding to the original pixel data of each of the pixels from a voltage outputted from the data driver according to the original pixel data of each of the pixels.

14. A method of driving a liquid crystal display (LCD) panel, comprising:

receiving first original pixel data corresponding to target gray levels to be displayed by pixels on a first scan line of the LCD panel;

receiving second original pixel data corresponding to target gray levels to be displayed by pixels on a second scan line of the LCD panel, wherein the second scan line is adjacent to the first scan line;

determining an absolute difference between an average of first original pixel voltages corresponding to the first original pixel data and an average of second original pixel voltages corresponding to the second original pixel data, and determining a correction voltage index according to the absolute difference;

obtaining a correction voltage, by means of table looking, according to the correction voltage index;

determining an adjusted second original voltage, corresponding to the target gray level to be displayed by a target pixel on the second scan line, according to an original pixel voltage of the target pixel in a second pixel row and the correction voltage; and applying the adjusted second original voltage to the target pixel to display the target gray level; wherein the absolute difference between the average of first original pixel voltages corresponding to the first original pixel data and the average of second original pixel voltages corresponding to the second original pixel data relates to a common voltage offset on a common electrode of the LCD panel; wherein a timing controller looking up a reference table to obtain the correction voltage according to the correction voltage index;

the timing controller selecting one of a plurality of reference tables as the reference table according to a row number of the LCD panel where the target pixel is located;

when the target pixel is located in an ith row of the LCD panel, the timing controller selects a first reference table as the reference table;

when the target pixel is located in a jth row of the LCD panel, the timing controller selects a second reference table as the reference table;

the correction voltage corresponding to the correction voltage index in the first reference table is smaller than the correction voltage corresponding to the same correction voltage index in the second reference table; and "i" and "j" are positive integers, and "i" is smaller than "j", the jth row is located in a lower section of the LCD panel than the ith row.

15. The method according to claim 14, wherein the correction voltage is further determined based on a location of the target pixel on the LCD panel.

16. The method according to claim 15, wherein the magnitude of the correction voltage corresponding to a target pixel in a mth row of the LCD panel is less than the magnitude of the correction voltage corresponding to a target pixel in an nth row of the LCD panel, wherein m and n are integers, and m is less than n.

17. The method according to claim 14, wherein determining the correction voltage is further based on an equivalent capacitance on the scan line on which the target pixel is located.

18. The method according to claim 14, wherein adjusting the voltage is further based on determining a feed-through voltage corresponding to the original pixel data of each of the pixels.

* * * * *